United States Patent
Horesh et al.

(10) Patent No.: US 9,888,021 B2
(45) Date of Patent: Feb. 6, 2018

(54) CROWD BASED DETECTION OF DEVICE COMPROMISE IN ENTERPRISE SETTING

(71) Applicant: International Business Machines Corporation, Armonk, NY (US)

(72) Inventors: Lior Horesh, North Salem, NY (US); Raya Horesh, North Salem, NY (US); Marco Pistoia, Amawalk, NY (US); Omer Tripp, Bronx, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 14/868,510

(22) Filed: Sep. 29, 2015

(65) Prior Publication Data

US 2017/0093899 A1   Mar. 30, 2017

(51) Int. Cl.
*H04L 29/06* (2006.01)
*G06N 5/04* (2006.01)
*G06N 99/00* (2010.01)

(52) U.S. Cl.
CPC ........... *H04L 63/1425* (2013.01); *G06N 5/04* (2013.01); *G06N 99/005* (2013.01)

(58) Field of Classification Search
CPC .......... H04L 63/1425; H04L 29/06911; G06N 99/005; G06F 21/55
See application file for complete search history.

(56) References Cited

U.S. PATENT DOCUMENTS

| | | | | |
|---|---|---|---|---|
| 9,166,993 | B1* | 10/2015 | Liu | H04L 63/1425 |
| 9,306,962 | B1* | 4/2016 | Pinto | H04L 63/1416 |
| 9,472,084 | B1 | 10/2016 | Barak et al. | |
| 9,483,742 | B1* | 11/2016 | Ahmed | G06N 99/005 |
| 2003/0065926 | A1* | 4/2003 | Schultz | G06F 21/562 |
| | | | | 713/188 |
| 2012/0137367 | A1* | 5/2012 | Dupont | G06F 21/00 |
| | | | | 726/25 |
| 2012/0240236 | A1* | 9/2012 | Wyatt | G06F 21/564 |
| | | | | 726/25 |
| 2013/0086072 | A1 | 4/2013 | Peng et al. | |
| 2013/0097683 | A1* | 4/2013 | Davis | G06F 21/88 |
| | | | | 726/7 |
| 2014/0007162 | A1 | 1/2014 | Harrison | |
| 2014/0189785 | A1 | 7/2014 | Castro et al. | |
| 2014/0189786 | A1 | 7/2014 | Castro et al. | |

(Continued)

OTHER PUBLICATIONS

Dua et al., "Combating Software and Sybil Attacks to Data Integrity in Crowd-Sourced Embedded Systems", ACM Transactions on Embedded Computer Systems, vol. 13, No. 5s, Publication date: Sep. 2014, pp. 154-1-154-19.

*Primary Examiner* — Hadi Armouche
*Assistant Examiner* — Sher A Khan
(74) *Attorney, Agent, or Firm* — Minh-Hien Vo

(57) ABSTRACT

A computer-implemented method, computer program product, and system for detecting anomalous behavior of computing devices are provided. The computer-implemented method for detecting anomalous behavior of computing devices may include establishing a network of computing devices; receiving shared data from the networked devices; determining device behavior; predicting future device behavior, detecting anomalous device behavior, and sending an alert in response to a detection of anomalous device behavior.

17 Claims, 3 Drawing Sheets

(56) References Cited

U.S. PATENT DOCUMENTS

| | | | |
|---|---|---|---|
| 2014/0372348 A1* | 12/2014 | Lehmann | G06K 9/6265 |
| | | | 706/12 |
| 2015/0074023 A1 | 3/2015 | Gu et al. | |
| 2015/0199224 A1* | 7/2015 | Mihnev | H04L 43/045 |
| | | | 714/37 |
| 2016/0063387 A1 | 3/2016 | Srivastava | |
| 2016/0241578 A1* | 8/2016 | Mahler | H04L 63/20 |

* cited by examiner

US 9,888,021 B2

CROWD BASED DETECTION OF DEVICE COMPROMISE IN ENTERPRISE SETTING

BACKGROUND

The present invention generally relates to mobile device security, and more particularly to the security of mobile devices using device behavior.

Mobile devices, such as smartphones, tablets and laptops have become an integral part of our personal life, and more recently, our work environment. Many people use their smartphone or tablet to access corporate or government email and calendars, or run enterprise applications.

To mitigate theft/compromise risks, government agencies, corporations and defense forces invest significant money and resources in securing their property. Some resources include video surveillance, security personnel, and identification checkpoints. At the same time, mobile devices are pervasive. Some devices are equipped with powerful sensors, such as a camera, microphone, gyro, GPS, accelerometer and touch-screen readers. Mobile devices provide excellent coverage of spaces of interest, and they are mobilized around the sensitive areas by people. To a large degree, the mobile devices within the premises of an enterprise satisfy a trust relation. More specifically, it can be statistically safe to assume that nearby devices are to be trusted for the purpose of collaboratively mining and calibrating sensor data.

SUMMARY

Embodiments of the present invention disclose a method, computer program product, and system for detecting anomalous behavior of computing devices is provided. The computer-implemented method may include establishing a network of computing devices; receiving shared data from the networked computing devices; determining device behavior of the networked computing devices using the shared data; predicting future device behaviors from the determined device behavior; detecting anomalous device behavior from the predicted future device behavior; and sending an alert in response to a detection of anomalous device behavior.

BRIEF DESCRIPTION OF THE DRAWINGS

Novel characteristics of the invention are set forth in the appended claims. The invention will best be understood by reference to the following detailed description of the invention when read in conjunction with the accompanying figures, wherein like reference numerals indicate like components, in which:

DETAILED DESCRIPTION

The present invention may be a system, a method, and/or a computer program product. The computer program product may include a computer readable storage medium (or media) having computer readable program instructions thereon for causing a processor to carry out aspects of the present invention. The present invention will now be described in detail with reference to the Figures.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 1:
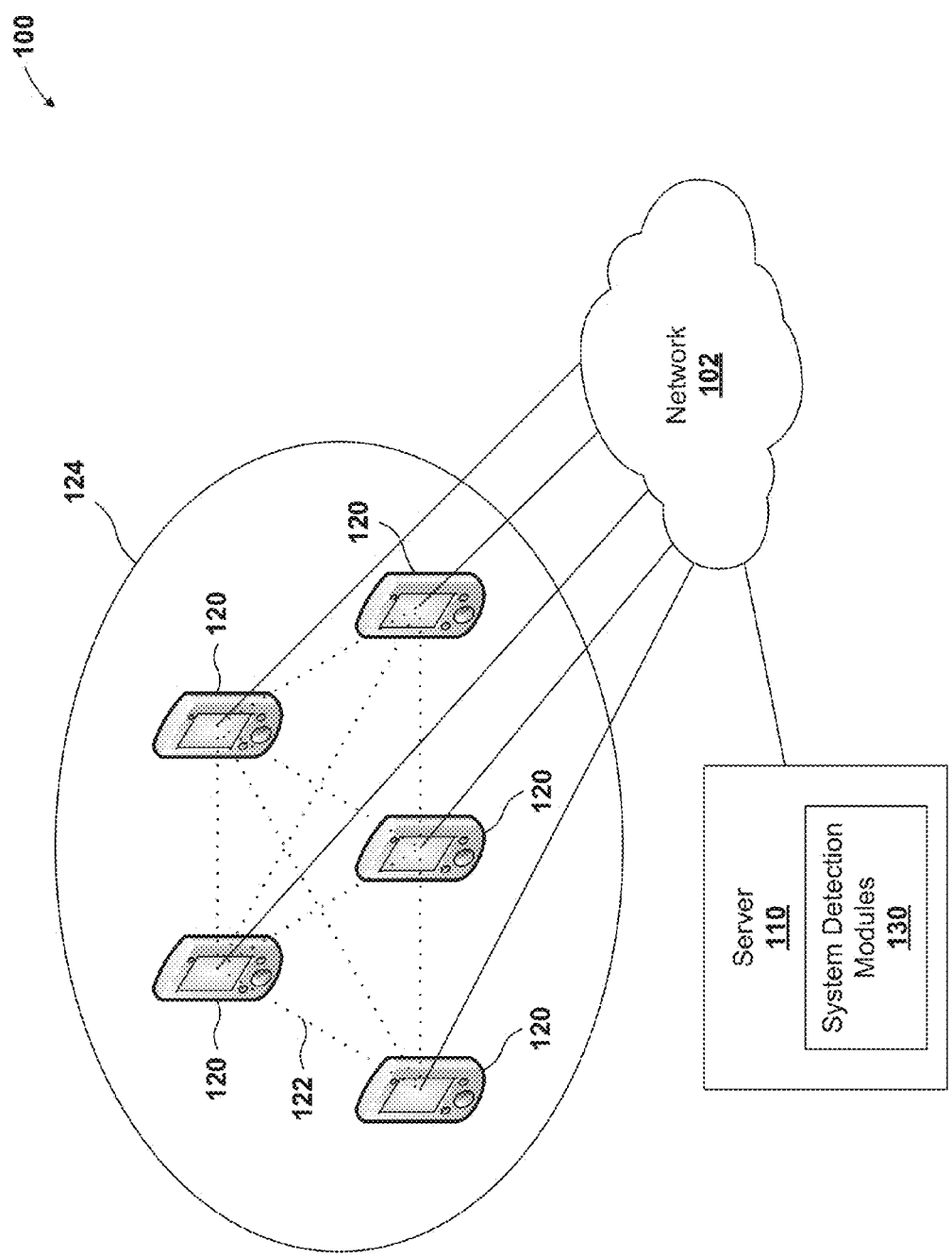
FIG. 1 illustrates networked computer environment, according to an embodiment.

Referring now to FIG. 1, a computer network environment 100 is provided, according to an embodiment. More specifically, the computer network environment 100 includes one or more mobile devices 120 connected to a server 130 through a network 102.

The communication between mobile device 120 and server 130 (e.g., through network 102) may include a variety of methods, such as, for example, a wide area network (WAN), local area network (LAN), a telecommunication network, a wireless network, a public switched network and/or a satellite network.

Mobile device 120 may include, for example, laptop computers, tablet computers, netbook computers, personal computers (PC), desktop computers, personal digital assistants (PDAs), smart phones, or any other networkable electronic device.

Server 110 can be a central mainframe server system such as a management server, a web server, an electronic device, a central computing server system, or any other communication management system. Server 110 can also represent a "cloud" of computers interconnected by one or more networks, where server 110 is a primary server for a computing system utilizing clustered computers when accessed through network 102. A system detection module 130 may be stored on the server 110 or any other location or device. The system detection module 130 may use shared device behavior information, gathered and analyzed from mobile devices 120, to determine anomalous device behavior.

A sample link 122 (dotted line) may be formed between mobile devices 120 within a circle of trust 124 using, for example, a linked layer via host-node technology. The circle of trust 124 forms a mutually agreed communication connection link (e.g., sample link 122) between mobile devices 124 to share and analyze device behavior information. Sample link 122 may be, for example, a mobile ad hoc network (MANET). The device behavior information may be used to determine ambiguous behavior of one or more of the mobile devices 120. The circle of trust 124 can be formed using assumptions that (i) there are a large number of mobile devices within a given area, and (ii) the mobile devices can largely be trusted. The circle of trust 124 can range from within a specific building to a larger geographical area.

Mutual gathering and analysis of device behavior information allows a mobile device to expend a small amount of resources to sample other device behavior within a given area. The shared device information may include, for example, battery level, location and/or the state of the device. The sensing and analysis of device behavior can be performed by the system detection module 130. The method of sensing and analysis the device behavior information is described in detail with reference to FIG. 2.

Figure 2:
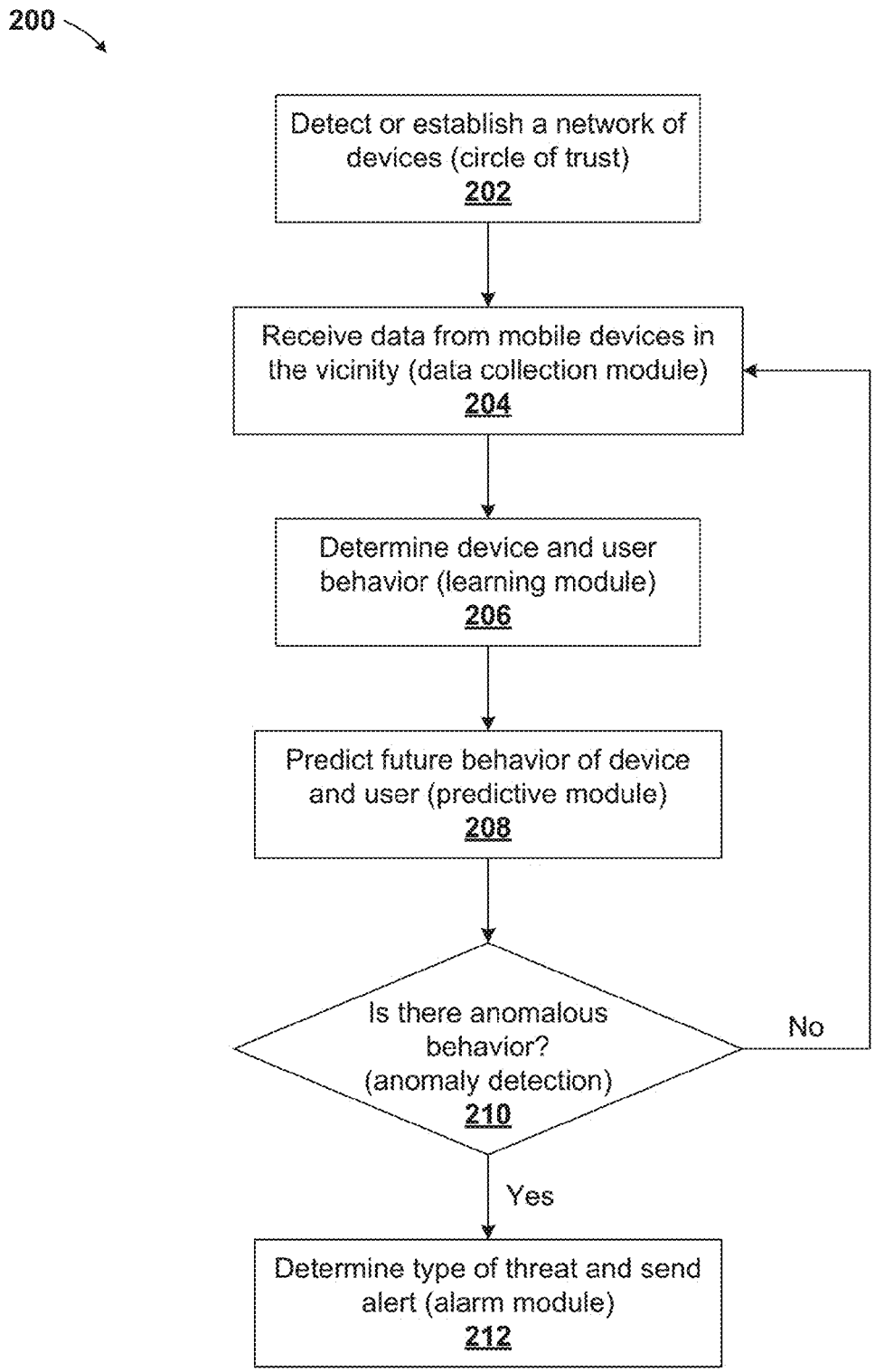
FIG. 2 illustrates an operational flowchart depicting the steps carried out by a program for gathering shared data and detecting anomalous device behavior, according to an embodiment.

Referring now to FIG. 2, a flowchart depicting operational steps of a security program 200 is provided, according to an embodiment. More specifically, the security program 200 runs a behavioral check of networked device behavior to determine the presence of anomalous behavior. The system detection module 130 (described with reference to FIG. 1) may run the security program 200.

A flowchart depicting exemplary steps of the security program may include; establishing a network of devices (Step 202), a data collection module (Step 204), a learning module (Step 206), a predictive module (Step 208), an anomaly detection module (Step 210) and/or action or alert modules (Step 212).

Referring now to Step 202, program 200 may establish a predetermined network such as the network of mobile devices 120 within the circle of trust 124 (described with reference to FIG. 1). Alternatively, program 200 may establish a new or dynamic network of devices depending on the security purpose.

Referring now to Step 204, once a network is detected, the data collection modules can collect device behavior information from networked devices. The data collection modules can include a devices status module and an environment status module. The device status module can record and transmit various indications of device status, such as, power state, power consumption, CPU usage, password attempts, updates and app installation to other devices or a central server. The environment status module can record and transmit various indications of environment status, such as, connectivity patterns, signal strength, throughput, common GPS locations, common WiFi networks, common Bluetooth devices, proximity sensor information, and updates to other devices or a central server.

Referring now to Step 206, the learning modules can receive the information from the data collection modules and analyze device behavior to determine typical behaviors for each networked device. The learning modules can include user specific learning modules, environment learning modules, and peer interaction learning modules. The user specific learning module can receive device status data, and learn the device's usage profile, mobile movement patterns and repetitive actions based on time/location. The personalization of user/device profiles can increase efficiency and predictive power. Learning refers to deduction of both rule based and/or probabilistic patterns. Learning can be performed using neural networks, regression models and decision trees. The environment learning module can receive the network environment data, and learn the environment behavior. The peer interaction learning module can learn interaction patterns across devices and users, map user associates and track schedules.

The predictive module can integrate the information from the learning modules and the enterprise databases (e.g., meeting calendar) into a predictive model of the ad-hoc network and its members.

Referring now to Step 208, the anomaly detection module can monitor the data arriving from the devices and the infrastructure, compare it to the predictive ones of the predictive model and detect anomalous or irregular patterns. The anomaly detection can be performed using classification methods (e.g., nearest neighbors and support vector machines), fuzzy logic outlier detection, cluster analysis and deviation from association rules.

Referring now to Step 208, the action module can alert users of determinations performed by the anomaly detection module based on threat level or type of anomaly. The action module can send an analysis of the type of anomalous behavior detected regarding one of the networked device. The analysis may include prescribed or recommended proactive actions, such as disconnection of a device, alerting nearby device users and alerting security.

For example, if a fully charged device is turned off, a warning may be issued, and actions may be taken, to address the issue. However, a device being turned off may not necessarily be an anomaly representing a high level of threat, therefore, more statistics may be gathered through device behavior to personalize a device profile for each networked device and/or an associated user. For example, a mobile device can communicate its battery level and device state to other networked devices on a periodic basis (e.g., while in the circle of trust 124). If the battery life is less than ten percent, it may be predictable that the device will be either charged or turned off. Alternatively, if the mobile device is turned off after communicating a power level of eighty percent, other statistics, such as meeting entries in a device calendar may be used to determine whether an alert should be issued. If no anomalies are detected, the program 200 may continue collecting and predicting device behaviors without issuing an alert.

The anomaly detection may be conducted in two ways. First, the ad-hoc peer devices may sense the anomaly and communicate that anomaly to other devices or to a central server. Alternatively, the ad-hoc infrastructure may sense the anomaly and communicate the anomaly to other devices.

Some other embodiments may include, for example, a static communication infrastructure, integration with individual calendar entries, forensic settings and irregular data and access attempts. The static communication infrastructure (e.g., routers, Bluetooth devices) can monitor a plurality of devices and communicate among themselves and with a centralized unit to identify correlation patterns (e.g., peers are switching wifi network as headed together to a meeting room) supplementing the collective sensing information. The integration of individual calendar entries (and/or additional corporate information) can have predictive capability, for example, the system will expect devices or specific peers who committed to attend meetings at a specific time and location to be located. The forensic settings, government and/or security agencies may proactively use collective sensing information of nearby devices to track crime during critical stages, the devices, by prior consent, can be controlled remotely to provide additional sensory information (sound, visual, etc) or even be asked to be directed by the user to give direction or be placed in a given location, when critical anomalies are alerted. Abnormal behavior, for example, sending irregular emails or data, attempts to connect via non-conventional ports, attempts to access restricted information or data, might be an indication that the devices has been hacked or compromised. If the abnormal behavior is detected, connection to peers and networks may be immediately halted and the ad-hoc environment may be alerted.

Figure 3:
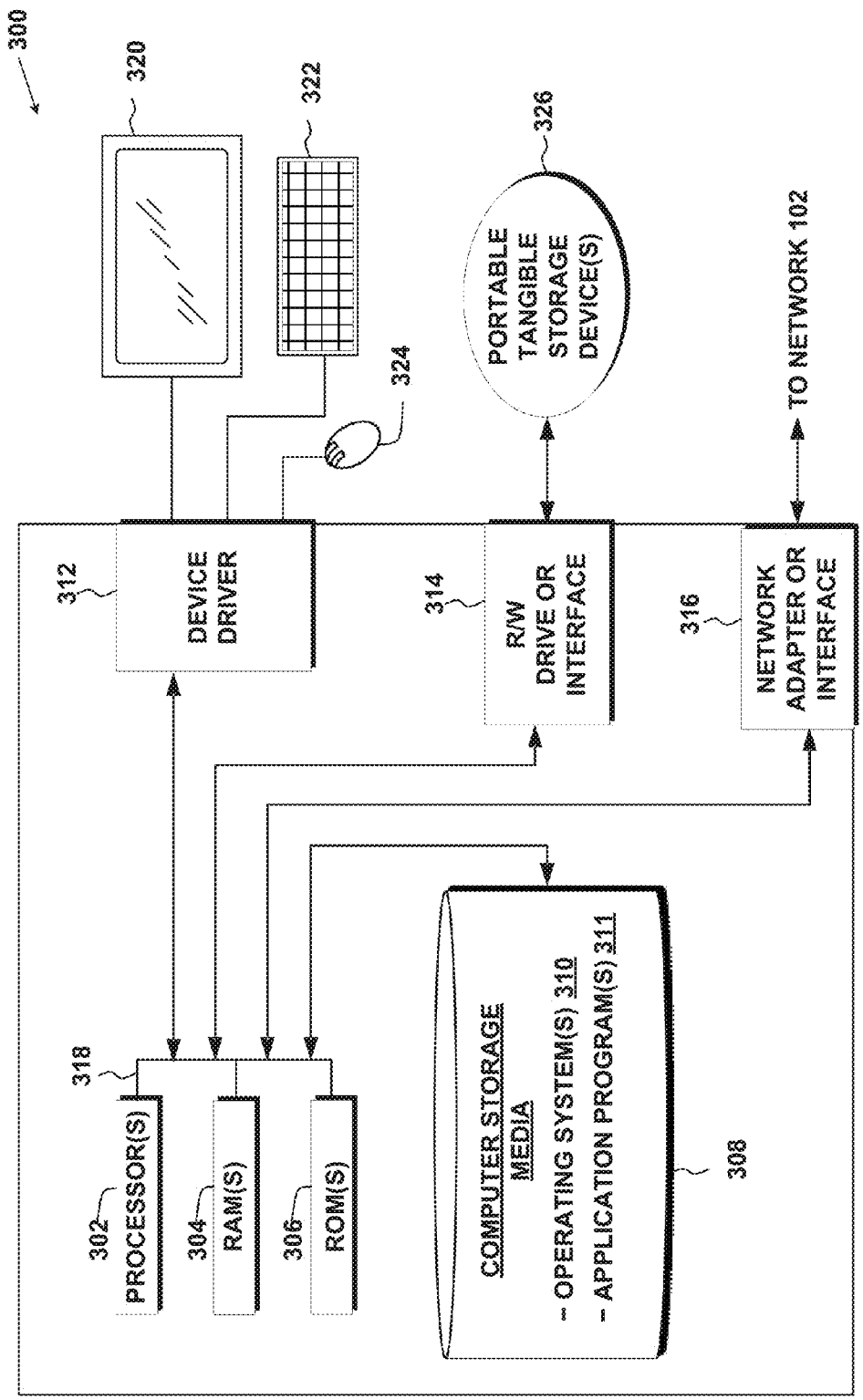
FIG. 3 illustrates a block diagram of components of a computing device, according to an embodiment.

Referring now to FIG. 3, a block diagram depicts components of a computing device 300, according to an embodiment. Computing device 300 may be the same as the mobile devices 120 or server 110 described with reference to FIG. 1. It should be appreciated that FIG. 3 provides only an illustration of one implementation and does not imply any limitations with regard to the environments in which different embodiments may be implemented. Many modifications to the depicted environment may be made.

Computing device 300 may include one or more processors 302, one or more computer-readable RAMs 304, one or more computer-readable ROMs 306, one or more computer readable storage media 308, device drivers 312, read/write drive or interface 314, network adapter or interface 316, all interconnected over a communications fabric 318. Communications fabric 318 may be implemented with any architecture designed for passing data and/or control information between processors (such as microprocessors, communications and network processors, etc.), system memory, peripheral devices, and any other hardware components within a system.

One or more operating systems 310, and one or more application programs 311 (e.g., the program 200) may be stored on one or more of the computer readable storage media 308 for execution by one or more of the processors 302 via one or more of the respective RAMs 304 (which typically include cache memory). In the illustrated embodiment, each of the computer readable storage media 308 may be a magnetic disk storage device of an internal hard drive, CD-ROM, DVD, memory stick, magnetic tape, magnetic disk, optical disk, a semiconductor storage device such as RAM, ROM, EPROM, flash memory or any other computer-readable tangible storage device that can store a computer program and digital information.

The computing device 300 may also include an R/W drive or interface 314 to read from, and write to, one or more portable computer readable storage media 326. Application program 311 on the computing device 300 may be stored on one or more of the portable computer readable storage media 326, read via the respective R/W drive or interface 314 and loaded into the respective computer readable storage media 308.

The computing device 300 may also include a network adapter or interface 316, such as a TCP/IP adapter card or wireless communication adapter (such as a 4G wireless communication adapter using OFDMA technology). Application programs 311 may be downloaded from an external computer or external storage device via a network (for example, the Internet, a local area network or other wide area network or wireless network) and network adapter or interface 316. From the network adapter or interface 316, the programs may be loaded onto computer readable storage media 308. The network may comprise copper wires, optical fibers, wireless transmission, routers, firewalls, switches, gateway computers and/or edge servers.

The computing device 300 may also include a display screen 320, a keyboard or keypad 322, and a computer mouse or touchpad 324. Device drivers 316 interface to display screen 320 for imaging, to keyboard or keypad 322, to computer mouse or touchpad 324, and/or to display screen 320 for pressure sensing of alphanumeric character entry and user selections. The device drivers 312, R/W drive or interface 314 and network adapter or interface 316 may comprise hardware and software (stored on computer readable storage media 308 and/or ROM 306).

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

What is claimed is:

1. A computer-implemented method for detecting anomalous behavior of mobile computing devices, the method comprising:
    establishing, by a plurality of mobile computing devices, a mobile ad hoc network (MANET) among the plurality of mobile computing devices, wherein each of the plurality of mobile computing devices communicates with all others of the plurality of computing devices over the MANET, and each of the plurality of mobile computing devices also communicates with a server over a network;
    receiving, by one or more of the plurality of mobile computing devices from each of the plurality of mobile computing devices, device status information and environmental status information over the MANET;
    detecting, by one of the one or more of the plurality of mobile computing devices, anomalous behavior of a mobile computing device of the plurality of mobile computing devices, based on the received information;
    in response to detecting the anomalous behavior: communicating, by the one of the one or more of the plurality of mobile computing devices to each of the plurality of mobile computing devices not having the anomalous device behavior, an alert relating to the detected anomalous device behavior;
    receiving, by the server from each of the plurality of mobile computing devices over the network, the device status information and environmental status information;
    generating, by the computing system, a predictive behavioral model of each of the plurality of mobile computing devices, based on the received device status information and environmental status information;
    comparing, by the server, device status information and environmental status information being received from each of the plurality of mobile computing devices to the generated predictive behavioral model of each of the plurality of mobile computing devices to determine if anomalous behavior has occurred; and
    in response to determining, by the server, that anomalous behavior has occurred:
    communicating, by the server to each of the plurality of mobile computing devices not having the anomalous device behavior, an alert relating to the detected anomalous device behavior.

2. The computer-implemented method of claim 1, wherein the established MANET includes a circle of trust that is formed between trusted networked mobile computing devices located within proximity of one another in a given area.

3. The computer-implemented method of claim 1, wherein the device status information includes one or more device attributes selected from the group consisting of: power state, power consumption, CPU usage, password attempts, and updates to other devices or a central server.

4. The computer-implemented method of claim 1, wherein the detected anomalous behavior is detected by using each of the device status information, the environmental status information, a device profile derived from the detected behavior, mobile movement patterns, and repetitive actions based on time and location.

5. The computer-implemented method of claim 1, wherein the mobile computing device having anomalous device behavior is denied access to the MANET by the one or more of the plurality of mobile computing devices.

6. The computer-implemented method of claim 1, wherein the environmental status information includes one or more device attributes selected from the group consisting of:
connectivity patterns, signal strength, data throughput, location, common WiFi networks, common Bluetooth devices, and proximity sensor information.

7. A computer program product for detecting anomalous behavior of mobile computing devices, the computer program product comprising:
one or more non-transitory computer-readable storage media and program instructions stored on one or more of the non-transitory computer-readable storage media, the program instructions comprising:
program instructions to establish, by a plurality of mobile computing devices, a mobile ad hoc network (MANET) among the plurality of mobile computing devices, wherein each of the plurality of mobile computing devices communicates with all others of the plurality of computing devices over the MANET, and each of the plurality of mobile computing devices also communicates with a server over a network;
program instructions to receive, by one or more of the plurality of mobile computing devices from each of the plurality of mobile computing devices, device status information and environmental status information over the MANET;
program instructions to detect, by one of the one or more of the plurality of mobile computing devices, anomalous behavior of a mobile computing device of the plurality of mobile computing devices, based on the received information; and
in response to detecting the anomalous behavior:
program instructions to communicate, by the one of the one or more of the plurality of mobile computing devices to each of the plurality of mobile computing devices not having the anomalous device behavior, an alert relating to the detected anomalous device behavior;
program instructions to receive, by the server from each of the plurality of mobile computing devices over the network, the device status information and environmental status information;
program instructions to generate, by the computing system, a predictive behavioral model of each of the plurality of mobile computing devices, based on the received device status information and environmental status information;
program instructions to compare, by the server, device status information and environmental status information being received from each of the plurality of mobile computing devices to the generated predictive behavioral model of each of the plurality of mobile computing devices to determine if anomalous behavior has occurred; and
in response to determining, by the server, that anomalous behavior has occurred:
program instructions to communicate, by the server to each of the plurality of mobile computing devices not having the anomalous device behavior, an alert relating to the detected anomalous device behavior.

8. The computer program product of claim 7, wherein the established MANET includes a circle of trust that is formed between trusted networked mobile computing devices located within proximity of one another in a given area.

9. The computer program product of claim 7, wherein the device status information includes one or more device attributes selected from the group consisting of: power state, power consumption, CPU usage, password attempts, and updates to other devices or a central server.

10. The computer program product of claim 7, wherein the detected anomalous behavior is detected by using each of the device status information, the environmental status information, a device profile derived from the detected behavior, mobile movement patterns, and repetitive actions based on time and location.

11. The computer program product of claim 7, wherein the mobile computing device having anomalous device behavior is denied access to the MANET by the one or more of the plurality of mobile computing devices.

12. The computer program product of claim 7, wherein the environmental status information includes one or more device attributes selected from the group consisting of:
connectivity patterns, signal strength, data throughput, location, common WiFi networks, common Bluetooth devices, and proximity sensor information.

13. A computer system for detecting anomalous behavior of mobile computing devices, the computer system comprising:
one or more computer processors, one or more non-transitory computer-readable storage media, and program instructions stored on one or more of the non-transitory computer-readable storage media for execution by at least one of the one or more processors, the program instructions, when executed by the at least one of the one or more processors, causing the computer system to perform a method comprising:
establishing, by a plurality of mobile computing devices, a mobile ad hoc network (MANET) among the plurality of mobile computing devices, wherein each of the plurality of mobile computing devices communicates with all others of the plurality of computing devices over the MANET, and each of the plurality of mobile computing devices also communicates with a server over a network;
receiving, by one or more of the plurality of mobile computing devices from each of the plurality of mobile computing devices, device status information and environmental status information over the MANET;
detecting, by one of the one or more of the plurality of mobile computing devices, anomalous behavior of a mobile computing device of the plurality of mobile computing devices, based on the received information; and
in response to detecting the anomalous behavior:
communicating, by the one of the one or more of the plurality of mobile computing devices to each of the plurality of mobile computing devices not having the anomalous device behavior, an alert relating to the detected anomalous device behavior;
receiving, by the server from each of the plurality of mobile computing devices over the network, the device status information and environmental status information;
generating, by the computing system, a predictive behavioral model of each of the plurality of mobile computing devices, based on the received device status information and environmental status information;
comparing, by the server, device status information and environmental status information being received from each of the plurality of mobile computing devices to the generated predictive behavioral model of each of the plurality of mobile computing devices to determine if anomalous behavior has occurred; and in response to determining, by the server, that anomalous behavior has occurred:

communicating, by the server to each of the plurality of mobile computing devices not having the anomalous device behavior, an alert relating to the detected anomalous device behavior.

14. The computer system of claim 13, wherein the established MANET includes a circle of trust that is formed between trusted networked mobile computing devices located within proximity of one another in a given area.

15. The computer system of claim 13, wherein the device status information includes one or more device attributes selected from the group consisting of: power state, power consumption, CPU usage, password attempts, and updates to other devices or a central server.

16. The computer system of claim 13, wherein the detected anomalous behavior is detected by using each of the device status information, the environmental status information, a device profile derived from the detected behavior, mobile movement patterns, and repetitive actions based on time and location.

17. The computer system of claim 13, wherein the environmental status information includes one or more device attributes selected from the group consisting of:

connectivity patterns, signal strength, data throughput, location, common WiFi networks, common Bluetooth devices, and proximity sensor information.

* * * * *